US010715395B2

(12) United States Patent
Adjodah et al.

(10) Patent No.: US 10,715,395 B2
(45) Date of Patent: Jul. 14, 2020

(54) METHODS AND APPARATUS FOR COMMUNICATION NETWORK

(71) Applicant: Massachusetts Institute of Technology, Cambridge, MA (US)

(72) Inventors: Dhaval Adjodah, Cambridge, MA (US); Alex Paul Pentland, Boston, MA (US); Esteban Moro, Brookline (UA); Yan Leng, Somerville, MA (US); Peter Krafft, Seattle, WA (US); Daniel Calacci, Jamaica Plain, MA (US); Abhimanyu Dubey, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/200,648

(22) Filed: Nov. 27, 2018

(65) Prior Publication Data

US 2019/0166005 A1 May 30, 2019

Related U.S. Application Data

(60) Provisional application No. 62/591,034, filed on Nov. 27, 2017, provisional application No. 62/678,800, filed on May 31, 2018.

(51) Int. Cl.
*G06F 15/16* (2006.01)
*H04L 12/24* (2006.01)
*G06N 20/00* (2019.01)

(52) U.S. Cl.
CPC ............. *H04L 41/12* (2013.01); *G06N 20/00* (2019.01); *H04L 41/16* (2013.01)

(58) Field of Classification Search
CPC ......... H04L 69/14; H04L 41/12; H04L 41/16; H04L 67/16
USPC ....................................... 709/223, 224, 220
See application file for complete search history.

(56) References Cited

U.S. PATENT DOCUMENTS 10,061,300 B1 8/2018 Coffman et al.
2017/0140270 A1 5/2017 Mnih et al.

OTHER PUBLICATIONS

Barkoczi, D., et al., Social learning strategies modify the effect of network structure on group performance; published in Nature Communications, vol. 7, Article No. 13109, Oct. 2016.
Erdos, P., et al., On random graphs I, published in Publicationes Mathematicae (Debrecen), vol. 6, pp. 290-297, Year 1959.
Garant, D., et al., Context-Based Concurrent Experience Sharing in Multiagent Systems; published in AAMAS '17 Proceedings of the 16th Conference on Autonomous Agents and MultiAgent Systems, pp. 1544-1546, May 2017.

(Continued)

*Primary Examiner* — Lan Dai T Truong
(74) *Attorney, Agent, or Firm* — Stephen R. Otis

(57) ABSTRACT

In some implementations of this invention, the performance of a network of reinforcement learning agents is maximized by optimizing the communication topology between the agents for the communication of gradients, weights or rewards. For instance, a sparse Erdos-Renyi network may be employed, and network density may be selected in such a way as to maximize reachability and to minimize homogeneity. In some cases, a sparse network topology is employed for massively distributed learning, such as across entire fleets of autonomous vehicles or mobile phones that learn from each other instead of requiring a master to coordinate learning.

11 Claims, 7 Drawing Sheets

(56) References Cited

OTHER PUBLICATIONS

Kauffman, S., et al., Towards a general theory of adaptive walks on rugged landscapes; published in Journal of Theoretical Biology, vol. 128, Issue 1, pp. 11-45, Sep. 1987.
Kirkpatrick, S., et al., Optimization by Simulated Annealing; published in Science, vol. 220, Issue 4598, pp. 671-680, May 1983.
Kok, J., et al., Collaborative Multigent Reinforcement Learning by Payoff Propagation; published in the Journal of Machine Learning Research, vol. 7, pp. 1789-1828, Dec. 2006.
Lazer, D., et al., The Network Structure of Exploration and Exploitation; published in Administrative Science Quarterly, vol. 52 issue 4, pp. 667-694, Dec. 1, 2007.
Macua, S., et al., Diff-DAC: Distributed Actor-Critic for Average Multitask Deep Reinforcement Learning; published in arXiv 1710.10363v2, Nov. 24, 2017.
Mason, W., et al., Collaborative learning in networks; published in PNAS Jan. 17, 2012 109 (3) 764-769.
MNIH, V., et al., Asynchronous Methods for Deep Reinforcement Learning; published in arXiv 1602.01783v2, Jun. 16, 2016.
Nedic, A., et al., Cooperative Distributed Multi-Agent Optimization, published in Convex Optimization in Signal Processing and Communications, 2009.
Salimans, T., et al., Evolution Strategies as a Scalable Alternative to Reinforcement Learning; published in arXiv1703.03864v1, Mar. 10, 2017.
Suri, S., et al., Cooperation and Contagion in Web-Based, Networked Public Goods Experiments; published in PLoS ONE, vol. 6, Issue 3, Mar. 11, 2011.
Wiestra, D., et al., Natural Evolution Strategies; published in Journal of Machine Learning Research 15 (2014) 949-980, Year 2014.
Zhou, L., et al., Multi-agent Reinforcement Learning with Sparse Interactions by Negotiation and Knowledge Transfer; published in arXiv 1508.05328v1, Aug. 2, 2015.

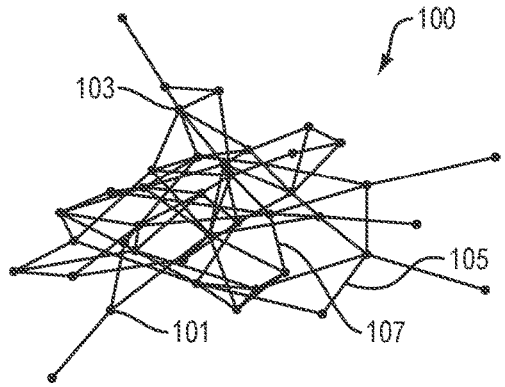

FIG. 1C

Algorithm 1 Networked Evolution Strategies

Input: Learning rate $\alpha$, noise standard deviation $\sigma$, initial policy parameters $\theta_i(0)$ where $i = 1, 2,$
..., N (for N workers), adjacency matrix $A$, global broadcast probability $p_b$
Initialize: $n$ workers with known random seeds, initial parameters $\theta_i(0)$
for $t = 0, 1, 2, ...$ do
    for each worker $i = 1, 2, ..., N$ do
        Sample $\epsilon_j(t) \sim N(0, I)$
        Compute returns $R_i = R(\theta_j(t) + \sigma \epsilon_j(t))$
Sample $\beta(t) \sim U(0,1)$
if $\beta(t) < p_b$
    Set $\theta_i(t+1) \leftarrow \arg\max_{\theta_j(t)} R(\theta_j(t) + \sigma \epsilon_j(t))$
else
    for each worker $i = 1, 2, ..., n$ do
        Set $\theta_i(t+1) \leftarrow \theta_i(t) + \frac{\alpha}{N\sigma^2} \sum_{j=1}^{N} a_{ij} \cdot \left( R(\theta_j(t) + \sigma \epsilon_j(t)) \cdot (\theta_j(t) + \sigma \epsilon_j(t) - \theta_i(t)) \right)$

FIG. 2

METHODS AND APPARATUS FOR COMMUNICATION NETWORK

RELATED APPLICATIONS

This application claims the benefit of U.S. Provisional Application No. 62/591,034 filed Nov. 27, 2017 (the "First Provisional") and U.S. Provisional Application No. 62/678,800 filed May 31, 2018 (the "Second Provisional"). As used herein, the "Provisionals" means the First Provisional and the Second Provisional

FIELD OF TECHNOLOGY

The present invention relates generally to networked communication and to deep reinforcement learning.

COMPUTER PROGRAM LISTING

The following 67 computer program files are incorporated by reference herein: agent updaters.txt with a size of about 12 KB; dist.txt with a size of about 11 KB; es.txt with a size of about 33 KB; main.txt with a size of about 6 KB; multi.txt with a size of about 2 KB; networks.txt with a size of about 1 KB; optimizers.txt with a size of about 2 KB; policies.txt with a size of about 12 KB; tabular_logger.txt with a size of about 7 KB; tf_util.txt with a size of about 9 KB; Ant_v1_Neighborhooderdos0_2_num_agents1000_broadcastp_0_8_threads_120.txt with a size of about 2 KB; HalfCheetah_v1_Neighborhooderdos0_2num_agents1000_broadcastp_0_8_threads_120.txt with a size of about 2 KB; Hopper_v1 Neighborhooderdos0_2num_agents1000_broadcastp_0_8_threads_120.txt with a size of about 2 KB; Humanoid_v1_Neighborhooderdos0_2num_agents1000_broadcastp_0_8_threads_120.txt with a size of about 2 KB; HumanoidStandup_v1_Neighborhooderdos0_2num_agents 1000_broadcastp_0_8_threads_120. txt with a size of about 2 KB; Swimmer_v1_Neighborhooderdos0_2num_agents1000_broadcastp_0_8_threads_120.txt with a size of about 2 KB; Neighborhood_selfloop_pselfloop_num_agents1000_broadcastp_0_1_threads_120.txt with a size of about 2 KB; Neighborhood_selfloop_pselfloop_num_agents1000_broadcastp_0_2_threads_120.txt with a size of about 2 KB; Neighborhood_selfloop_pselfloop_num_agents1000_broadcastp_0_3_threads_120.txt with a size of about 2 KB; Neighborhood_selfloop_pselfloop_num_agents1000_broadcastp_0_4_threads_120.txt with a size of about 2 KB; Neighborhood_selfloop_pselfloop_num_agents1000_broadcastp_0_5_threads_120.txt with a size of about 2 KB; Neighborhood_selfloop_pselfloop_num_agents1000_broadcastp_0_6_threads_120.txt with a size of about 2 KB; Neighborhood_selfloop_pselfloop_num_agents1000_broadcastp_0_7_threads_120.txt with a size of about 2 KB; Neighborhood_selfloop_pselfloop_num_agents1000_broadcastp_0_8_threads_120.txt with a size of about 2 KB; Neighborhood_selfloop_pselfloop_num_agents1000_broadcastp_0_9_threads_120.txt with a size of about 2 KB; Neighborhood_selfloop_pselfloop_num_agents1000_broadcastp_0_threads_120.txt with a size of about 2 KB; Neighborhood_selfloop_pselfloop_num_agents1000_broadcastp 1_threads_120.txt with a size of about 2 KB; Ant_v1_Neighborhoodfully connected num_agents100 broadcastp_0_0_threads_120.txt with a size of about 2 KB; Ant_v1_Neighborhoodscalefreem4 num_agents100 broadcastp_0_8_threads_120.txt with a size of about 2 KB; HalfCheetah_v1_Neighborhoodfully connected num_agents100 broadcastp_0_0_threads_120.t xt with a size of about 2 KB; HalfCheetah_v1_Neighborhoodscalefreem4 num_agents100 broadcastp_0_8_threads_120.txt with a size of about 2 KB; Hopper_v1_Neighborhoodfully_connected_num_agents100 broadcastp_0_0_threads_120.txt with a size of about 2 KB; Hopper_v1 Neighborhoodscalefreem4 num_agents100 broadcastp_0_8_threads_120.txt with a size of about 2 KB; Humanoid_v1_Neighborhoodfully_connected_num_agents100 broadcastp_0_0_threads_120.txt with a size of about 2 KB; Humanoid_v1_Neighborhoodscalefreem4 num_agents100 broadcastp_0_8_threads_120.txt with a size of about 2 KB; vanilla 1K.txt with a size of about 1 KB; vanilla_2K.txt with a size of about 1 KB; vanilla_3K.txt with a size of about 1 KB; vanilla_4K.txt with a size of about 1 KB; vanilla_5K.txt with a size of about 1 KB; vanilla_6K.txt with a size of about 1 KB; vanilla_7K.txt with a size of about 1 KB; vanilla_8K.txt with a size of about 1 KB; vanilla_9K.txt with a size of about 1 KB; experiment_generator_small_networks_mujoco_erdos_ontheflytopo.txt with a size of about 7 KB; experiment_template.txt with a size of about 2 KB; es_network. txt with a size of about 2 KB; install_bullet.txt with a size of about 1 KB; networks_generator.txt with a size of about 6 KB; redis_local_mirror.txt with a size of about 46 KB; redis_master.txt with a size of about 46 KB; dependency.txt with a size of about 5 KB; ec2ctl.txt with a size of about 10 KB; launch.txt with a size of about 11 KB; local_env_setup.txt with a size of about 1 KB; local_run_exp.txt with a size of about 1 KB; local_run_redis.txt with a size of about 1 KB; packer.txt with a size of about 1 KB; viz.txt with a size of about 2 KB; watch_master_process.txt with a size of about 2 KB; watch_master_redis.txt with a size of about 1 KB; watch_worker_process.txt with a size of about 1 KB; watch_worker_redis.txt with a size of about 1 KB; deploy.txt with a size of about 11 KB; request.txt with a size of about 3 KB; start_local.txt with a size of about 2 KB; and test_local.txt with a size of about 2 KB. Each of the above 67 computer program files were created as an ASCII .txt file on Nov. 17, 2018.

SUMMARY

In conventional deep reinforcement learning (DRL), the communication architecture typically involves all reinforcement learning agents intermittently communicating with each other (in a fully connected topology) or with a centralized server (in a star topology).

In contrast, in illustrative implementations of this invention, other network topologies are employed, leading to strong improvements in performance.

In illustrative implementations of this invention, the performance of a group of reinforcement learning agents is maximized by optimizing the communication topology between the agents for the communication of gradients, weights or rewards.

The optimized network topology may achieve faster and higher decentralized learning with much cheaper communication costs in networks of reinforcement learning agents, compared to fully connected networks.

In some cases, the optimized network topology is employed for massively distributed learning, such as across entire fleets of autonomous vehicles or mobile phones that learn from each other, instead of requiring a master to coordinate learning. Such sparse networks of communication between autonomous vehicles (or between mobile phones) may occur naturally due to geographic dispersion of the vehicles or mobile phones.

In some implementations: (a) a sparse Erdos-Renyi graph is employed; and (b) the network density is selected in such a way as to maximize "reachability" and to minimize "homogeneity", as those terms are defined herein.

In some implementations, a network is employed that is both globally and locally sparse. For instance, in some implementations, a graph is employed that comprises random graph clusters, each sparsely connected internally, with few connections between clusters. For example, an "engineered" graph may be employed that comprises sparsely connected clusters, where each of the clusters is itself a sparse Erdos-Renyi graph. In some cases, this "engineered" graph is generated by random partition graph generation.

In some implementations of this invention, reinforcement learning agents perform better in sparse network topologies than in more dense network topologies. In some cases, in these spare network topologies, the agents are not fully connected, and are instead connected only to a subset of neighbors both for local connections and for global (long-distance) connections.

In illustrative implementations of this invention, learning agents are arranged in efficient communication topologies for improved learning. This is desirable, because a common technique to improve speed and robustness of learning in DRL and many other machine learning algorithms is to run multiple learning agents in parallel.

In some implementations, this invention employs what we call Networked Evolution Communication Strategies (NetES), which is an improvement over a conventional Evolution Strategies (ES) paradigm. NetES may be employed with a wide variety of network topologies. For instance, in a test: (a) NetES was employed with each of four different graph families; and (b) one such family (Erdos-Renyi random graphs) empirically outperformed the other three graph families, including de facto fully-connected communication topologies. In a test of this prototype, 1000 reinforcement learning agents: (a) were arranged in a sparse Erdos-Renyi communication topology; and (b) performed better than 3000 agents arranged in a de facto fully-connected topology.

In illustrative implementations of this invention, communication topology between learning agents is improved or optimized, which in turn causes distributed machine learning algorithms to learn more efficiently.

In illustrative implementations, reinforcement learning agents communicate parameters, experiences, gradients and/or rewards with one another through a network. Neighborhood and neighbors in the network, and topology of the network, may be defined by an adjacency matrix.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 1C shows an Erdos-Renyi graph.

FIG. 2 shows steps in a Networked Evolution Communication Strategies (NetES) algorithm.

Figure 1A:
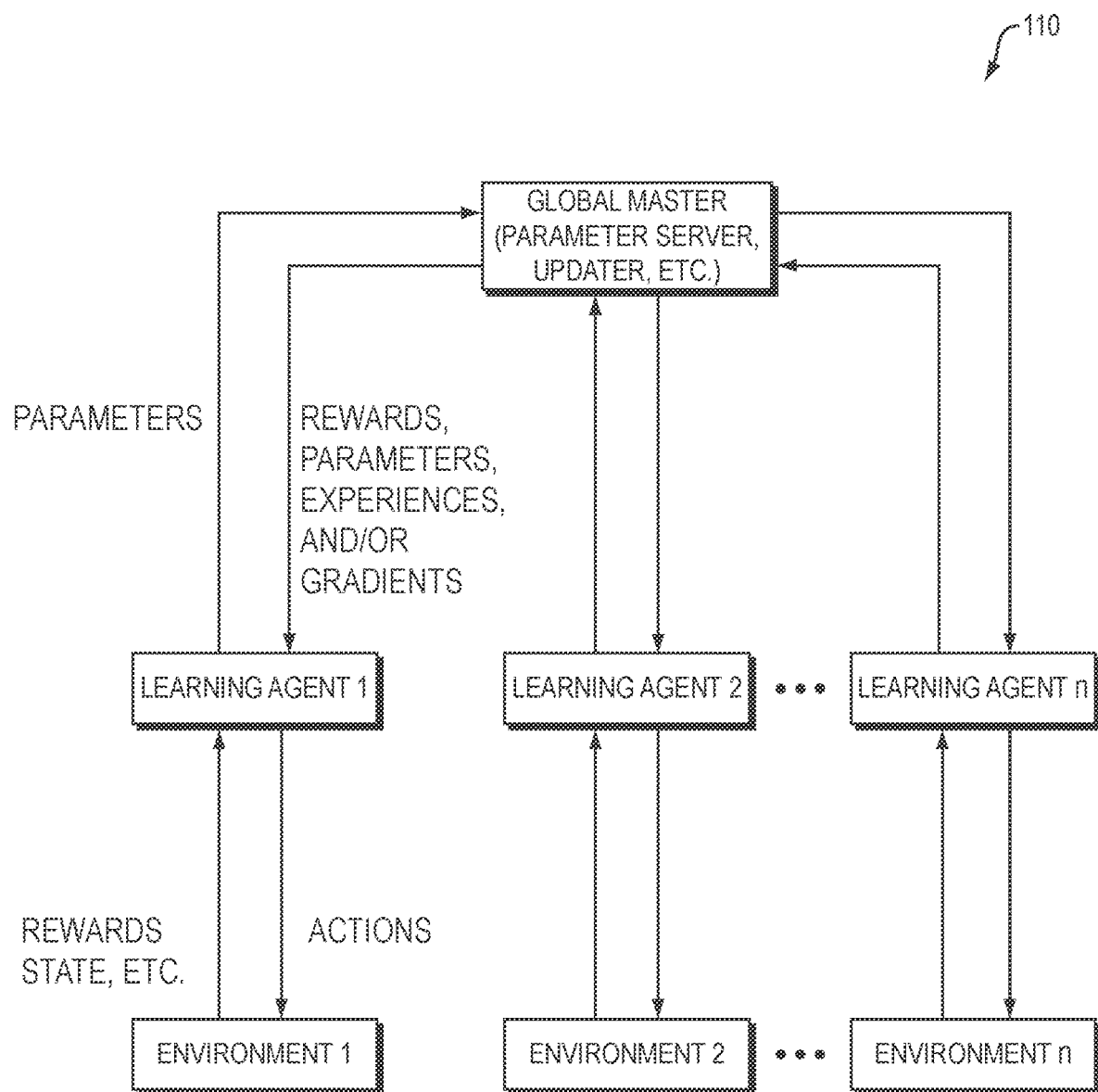
FIG. 1A shows a conventional star network, in which each learning agent communicates with a single hub.

The above Figures are not necessarily drawn to scale. The above Figures (except FIG. 1A) show illustrative implementations of this invention, or provide information that relates to those implementations. The examples shown in the above Figures do not limit this invention. This invention may be implemented in many other ways.

DETAILED DESCRIPTION

General

In distributed algorithms there may be an implicit communication network between processing units. This network may pass information such as data, parameters, or rewards between processors. In conventional distributed machine learning, one of the following two network structures is frequently used: (1) a complete network, in which all processors communicate with each other; or (2) a star network, in which all processors communicate with a single hub server (in effect, a more efficient, centralized implementation of the complete network).

In illustrative implementations of this invention, other communication topologies (i.e., other than the complete network or star network described above) between processors lead to improved learning performance in the context of deep reinforcement learning (DRL). In some cases, the communication topology between agents is improved (or optimized) for the learning objective under consideration. In some cases, certain families of network topologies lead to strong improvements over fully-connected networks.

Network effects tend to be significant only with large numbers of agents. Thus, in some implementations, we employ a novel DRL algorithm that is well-suited for parallelizability and scalability. We call this novel DRL algorithm Networked Evolution Communication Strategies (NetES). NetES is a networked decentralized algorithm that is a variant of, and improvement on, the original ES (Evolution Strategies) algorithm. In some implementations, using the NetES algorithm, we explore how the topology of a population of processors affects learning performance. In some cases, NetES is parallelizable and allows for greater exploration of parameter space than does the original ES algorithm.

In a test of a prototype of this invention: (1) we ran control experiments to see whether any improvements were due exclusively to using alternative topologies; (2) we compared the learning performance of the topological families of communication graphs, and observed that one family (Erdos-Renyi graphs) did best; and (3) using an optimized Erdos-Renyi graph, we evaluated NetES on five difficult DRL benchmarks and found large improvements compared to using a fully-connected communication topology. In this test, we observed that a 1000-agent Erdos-Renyi graph can compete with 3000 fully-connected agents.

In some implementations of this invention, multiple reinforcement learning agents run in parallel and are arranged in more efficient communication topologies for improved learning. This is in turn may improve both speed and robustness of learning in DRL.

Many conventional DRL algorithms: (a) run learning agents in parallel (and sometimes asynchronously; and (b) learn using non-correlated data collected by several agents in parallel. However, in these conventional DRL algorithms (including ES, Gorila, and A3C), agents are organized in a de facto fully-connected centralized network topology: the algorithm uses and updates only one global-level parameter set using information available from all agents at every step.

Evolution Strategies

Before we describe NetES (a novel algorithm employed in some implementations of this invention) in detail, it is helpful to consider NetES' conventional predecessor, Evolution Strategies (ES) and to consider how ES may be applied to DRL. Evolution Strategies is a class of techniques to solve optimization problems by utilizing a derivative-free parameter update approach. The algorithm proceeds by selecting a fixed model, initialized with a set of weights θ (whose distribution $p_\phi$ is parameterized by $\phi$), and an objective (reward) function R(•). The ES algorithm then maximizes the average objective value $\mathbb{E}_{\theta \sim p_\phi} R(\theta)$, which is optimized with stochastic gradient ascent. The score function estimator for $\nabla_\phi \mathbb{E}_{\theta \sim p_\phi} R(\theta)$ is similar to REINFORCE, given by $\nabla_\phi \mathbb{E}_{\theta \sim p_\phi} R(\theta) = \mathbb{E}_{\theta \sim p_\phi}[R(\theta) \nabla_\phi \log p_\phi(\theta)]$.

The update equation used in this Evolution Strategies algorithm for the parameter θ at any iteration t+1, for an appropriately chosen learning rate α and noise standard deviation σ, is a discrete approximation to the gradient:

$$\theta^{(t+1)} = \theta^t + \frac{\alpha}{N\sigma^2} \sum_{i=1}^{N} (R(\theta^{(t)} + \sigma\epsilon_i^{(t)}) \cdot \sigma\epsilon_i^{(t)}) \quad \text{(Eq. 1)}$$

In the Evolution Strategies algorithm, this update rule is normally implemented by spawning a collection of N agents at every iteration t, with perturbed versions of $\theta^{(t)}$, i.e. $\{(\theta^{(t)} + \sigma\epsilon_1^{(t)}), \ldots, (\theta^{(t)} + \sigma\epsilon_N^{(t)})\}$ where $\epsilon \sim \mathcal{N}(0,1)$ and I is the identity matrix. The algorithm then calculates $\theta^{(t+1)}$ which is broadcast again to all agents, and the process is repeated.

Networked Evolution Strategies

In some implementations of this invention, we employ a novel DRL algorithm that is well-suited for parallelizability and scalability. We call this novel DRL algorithm Networked Evolution Communication Strategies (NetES). NetES is a networked decentralized variant of, and an improvement over, ES (Evolution Strategies).

In NetES, to maximize parameter exploration diversity, each agent may hold its own parameter $\theta_i^{(t)}$ instead of the global (noised) parameter $\theta^{(t)}$ given in Equation 1 above. At each time-step, an agent may look at the rewards and parameters of its neighbors, which is controlled using matrix $A = \{\alpha_{ij}\}$, where $\alpha_{ij}=1$, if agents i and j communicate with each other, and 0 otherwise. A represents the adjacency matrix of connectivity if the networks were connected in a graph-like structure, and therefore characterizes fully the communication topology between agents. Each agent may then calculate a gradient by computing a weighted average of the difference vector between its parameter and that of each of its neighbors, $((\theta_j^{(t)} + \sigma\epsilon_j^{(t)}) - (\theta_i^{(t)}))$, using its neighbors' normalized rewards $R(\theta_j^{(t)} + \sigma\epsilon_j^{(t)})$ as weights. This leads to the update rule:

$$\theta_i^{(t+1)} = \theta_i^{(t)} + \frac{\alpha}{N\sigma^2} \sum_{j=1}^{N} a_{ij} \cdot (R(\theta_j^{(t)} + \sigma\epsilon_j^{(t)}) \cdot (\theta_j^{(t)} + \sigma\epsilon_j^{(t)} - \theta_i^{(t)})) \quad \text{(Eq. 2)}$$

Consequently, when agents have the same parameter (i.e. $\theta_i^{(t)} = \theta_j^{(t)}$), and the network is fully-connected i.e. $\alpha_{ij}=1$), this update rule reduces to Equation 1.

One may interpret Equation 1 as involving an average of the perturbations $\sigma\epsilon_i^{(t)}$ weighted by reward, such that ES corresponds to a kind of consensus-by-averaging algorithm. Equation 2 corresponds to the same weighted average, but averages the differences between the agent i's neighbors' perturbed positions, $(\theta_j^{(t)} + \sigma\epsilon_j^{(t)})$, from the agent i's starting position, $\theta_i^{(t)}$. Equation 2 is an update rule employed in NetES, in some implementations of this invention.

In some implementations, the NetES algorithm may achieve either a biased or an unbiased gradient estimate, marginalizing over time steps between broadcasts. In some cases, the update rule in Equation 2 is combined with a periodic parameter broadcast, and every broadcast returns the agents to a consensus position.

In some implementations of this invention, the NetES algorithm involves a stochastic global broadcast. In this stochastic global broadcast, with probability β each iteration, all agents are forced to adopt the highest-performing parameter set from the previous iteration, centering the network on a current local maximum. Preferably, probability β is set at a value that is greater than or equal to 0.5. For instance in some cases, probability β=0.8. In experiments, we found that when probability β is set lower than 0.5, broadcast has minimal effect on both the reward and learning rate of the network topologies. The stochastic global broadcast may be employed to correct the following problem: when nodes search for better parameters in their local neighborhood only, the effective combination of possible parameters around any parameter decreases significantly, scaling with the size of a node's neighborhood.

In some implementations, parameter broadcast in NetES is implemented as follows: (a) at every iteration, with a probability $p_b$, all agents' current parameters are replaced with the best agent's performing weight; and (b) then training (as per Equation 2) continues. In some cases, broadcast probability $p_b$ is treated as a hyperparameter. For instance, in some cases, probability $p_b$ is a constant equal to 0.8.

As noted above, in NetES, each agent may hold its own parameter set $\theta_i^{(t)}$ instead of a global (noised) parameter $\theta^{(t)}$.

In NetES, independent, networked agents may be employed. Each agent may have its own individual parameter set $\theta_i^{(t)}$ and may perform updates separately. (This is in contrast to conventional Evolution Strategies, which runs a number of episodes, each with a noised version of the parameter).

In some implementations of this invention, NetES may be implemented as follows. Each agent may run an episode with a different parameter. The agents maybe arranged in an undirected, unweighted network structure with each agent i corresponding to a node $v_i$ in the network. On each iteration t, the parameter set $\theta_i^{(t)}$ of agent i may be perturbed by a Gaussian noise vector $\in_i$ sampled in the same way as in the conventional Evolution Strategies algorithm. In an optimization step, each agent may perform its own independent update. Each agent i may use the same rank-centered weighting function as in the conventional ES, but may use only a closed set of its neighborhood N [i] to perform the update. This set of nodes may include node i itself. Different agents may have different parameters, and the difference in parameters between $\theta_i^{(t)}$ and each perturbed parameter set of other agents in N [i] may be calculated. Each difference may be weighted with its reported reward, instead of calculating a gradient by computing a weighted average over the perturbations applied to each neighbor's parameter set (as in the Evolution Strategies algorithm).

In NetES, the parameter sets of different nodes (agents) may diverge after the first update. In NetES, the update step may have each node effectively solving for its neighborhood's average objective, rather than the global average objective as in ES. In the case of a fully-connected network: (a) each agent's neighborhood N [i] is equal to the full set of vertices; and (b) the update is equal to the case of the original ES algorithm.

In some cases, the divergent objective functions in NetES may result in a greater diversity of policies being explored. In some cases, the neighborhood-only constraint on node parameter updating does not add any penalty term to the update step.

In some cases, when running an NetES algorithm: (a) any arbitrary number of parameters may be explored; (b) 4% to 10% of the agents are employed for updating an agent's parameter set; (c) stochastic parameter broadcast is employed; and (d) any arbitrary type of network topology may be employed. In contrast, in conventional ES: (a) one parameter is explored; (b) 100 percent of the agents are employed for updating an agent's parameter set; (c) stochastic parameter broadcast is not employed; and (d) an effectively fully-connected network topology is employed.

FIG. 2 shows an example of an algorithm for NetES, in an illustrative implementation of this invention.

Other Algorithms

This invention is not limited to NetES. In some implementations of this invention, any other distributed DRL algorithm or other distributed machine learning algorithm may be employed. For instance, in some implementations of this invention, an A3C algorithm is modified as follows, and employed for DRL: (a) the gradient and slowly changing network parameters of each agent are shared and constructed only using that agent's neighbors; and (b) whatever is done at the global level in the original A3C algorithm is instead done at the node level.

In some implementations of this invention, other update rules (i.e., update rules other than those set forth in Equations 1 and 2) are employed. In some cases, sparser networks are better as long as the distributed strategy is to find and aggregate the parameters with the highest reward (as opposed to, for example, finding the most common parameters many agents hold). In some implementations of this invention, regardless of which update rule is employed, the choice of network topology affects deep reinforcement learning.

In some implementations of this invention, other DRL algorithms may be employed, instead of NetES. For instance, is some cases, a dynamic network is employed. In this dynamic network, edges between nodes may be changed at each iteration. Likewise, in some cases, a gradient-based DRL algorithm is employed.

Network Topologies

In illustrative implementations of this invention, a wide variety of network topologies may be employed for DRL. Here are some non-limiting examples:

(1) Erdos-Renyi Network: In some implementations of this invention, an Erdos-Renyi (ER) network is employed for DRL. For instance, the NetES algorithm may run on an ER network and may perform DRL. In an ER network, each edge between any two nodes has a fixed independent probability of being present. Erdos-Renyi random graphs are constructed by connecting each pair of possible nodes at random with probability p. In some implementations: (a) an ER random network is employed; and (b) the probability p (i.e., the probability that any given pair of nodes in the ER random graph is be connected by an edge) is any value greater than 0 and less than or equal to 1. For instance, in some cases, the probability p is 0.04.

(2) Engineered: In some implementations of this invention, an "engineered" network topology may be employed for DRL. For instance, the NetES algorithm may be employed with an "engineered" network for DRL.

In some cases, the "engineered" network topology may be created by random partition graph generation, a generalization of the planted-1-partition scheme, which allows us to vary statistics such as clustering and centrality, while keeping modularity constant. First, the graph may be split into k sub-communities, and each node may be assigned to a sub-community with uniform probability, similar to an Erdos-Renyi graph. The following routine may then be run for a set number of iterations: first, sample a source node $n_s$ from the network, then, with probability $p_{in}$, sample a second target node $n_t$ from the same cluster $n_k$ that both $n_s$ and $n_t$ belong to. Otherwise, with probability $p_{in}$, sample the node $n_t$ from all nodes not in the same cluster $n_k$, and construct an edge between $n_s$ and $n_t$ (in between clusters). All sampling may performed with replacement, resulting in graphs with differing numbers of edges. In effect, the resulting engineered graph may comprise a number of smaller Erdos-Renyi clusters connected to each other. For instance, an "engineered" graph may comprise sparsely connected clusters, where each of the clusters is itself a sparse Erdos-Renyi graph.

(3) Other Networks: In some cases, other types of network topologies (e.g., scale-free networks or small-world networks) may be employed for DRL. For instance, the NetES algorithm may be run on a scale-free network or a small-world network and may be employed for DRL. The degree distribution of scale-free networks follows a power law. In small-world networks, most nodes may be reached through a small number of neighbors.

In some implementations, a graph is employed that is both globally and locally sparse. For instance, in some implementations, a graph is employed that consists of random graph clusters, each sparsely connected internally, with few connections between clusters.

FIG. 1A shows a conventional star network 110, in which each DRL learning agent communicates with a single hub (the global master). In the conventional star network in FIG. 1A, learning agents obtain their parameters from and share their data with a global master. Because they share all information via a global master, the network topology of communication between agents may effectively be fully connected.

Figure 1B:
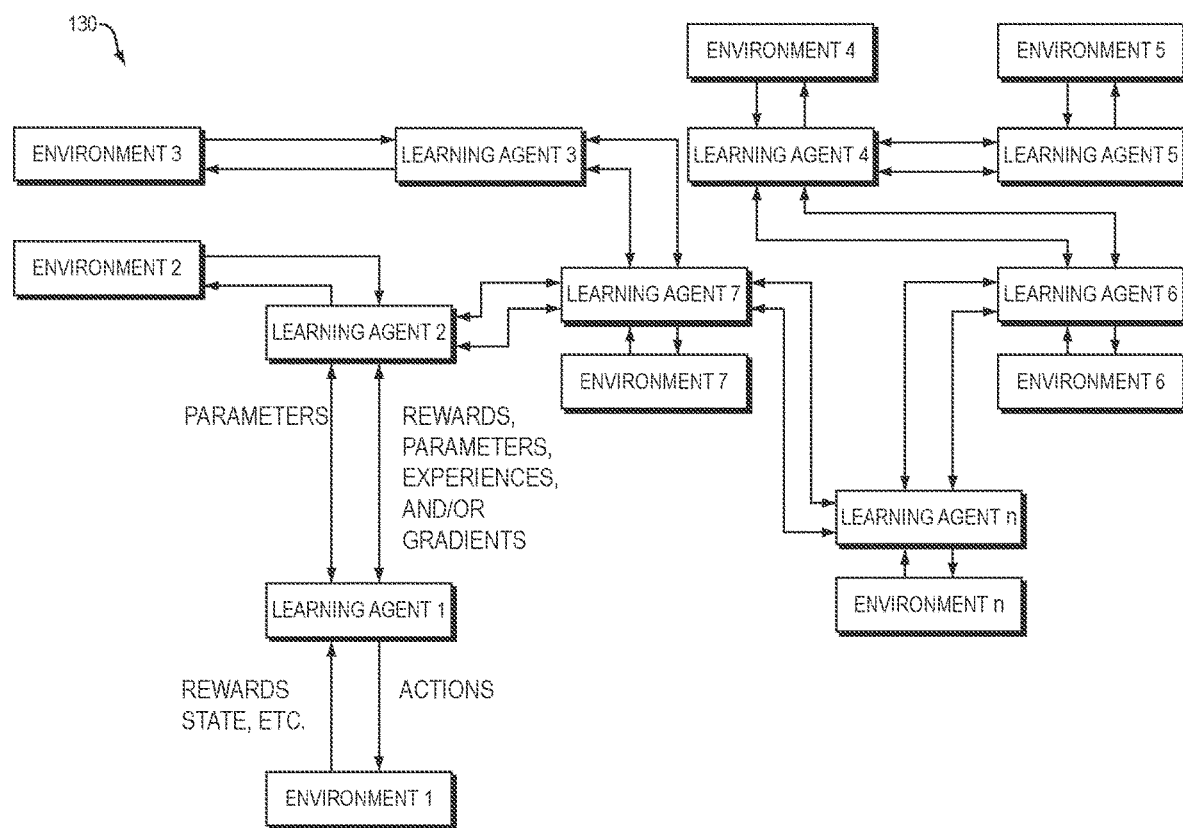
FIG. 1B shows a sparse, decentralized network topology.

FIG. 1B shows a network 130 with a sparse, decentralized network topology, in an illustrative implementation of this invention. In FIG. 1B, learning agents act as their own local master, obtaining their parameters from and sharing their data with one another. In FIG. 1B, the learning agents share information only via one another and thus the network topology of communication is sparse.

FIG. 1C shows a network 100 that is an Erdos-Renyi graph, in an illustrative implementation of this invention. In the example shown in FIG. 1C, the network includes nodes (e.g., 101, 103) and edges (e.g., 105, 107).

Optimizing Network Topology—General

In some implementations of this invention, the performance of a group of reinforcement learning agents is maximized by optimizing the communication topology between the agents for the communication of gradients, weights or rewards.

Likewise, in some implementations of this invention, the performance of a group of reinforcement learning agents is improved by improving the communication topology between the agents for the communication of gradients, weights or rewards.

In some implementations of this invention, a large number of different network topologies are tested, and the network topology which results in the best DRL learning performance is then employed for DRL.

Optimizing Network Topology—Maximizing Reachability and Minimizing Homogeneity

In some implementations: (a) a sparse Erdos-Renyi graph is employed; and (b) the network density is selected in such a way as to maximize "reachability" and to minimize "homogeneity", as those terms are defined herein.

This approach is well-suited for running an NetES algorithm using an Erdos-Renyi network.

The following discussion provides insights into: (a) why a sparse network topology may perform better than a fully-connected topology; (b) why Erdos-Renyi networks may outperform other network families; and (c) why performance of a network (e.g., a sparse ER topology) may be optimized (or improved) by maximizing the reachability of the network and the minimizing the homogeneity of the network.

A reason for employing sparse connectivity and having each agent hold their own parameters (as per Equation 2) is to search the parameter space more effectively. One possible heuristic for measuring the capacity to explore the parameter space is the diversity of parameter updates during each iteration, which can be measured by the variance of parameter updates:

In a NetES update iteration t for a system with N agents with parameters $\Theta = \{\theta_1^{(t)}, \ldots, \theta_N^{(t)}\}$, agent communication matrix $A = \{\alpha_{ij}\}$, agent-wise perturbations $\mathcal{E} = \{\epsilon_1^{(t)}, \ldots, \epsilon_N^{(t)}\}$, and parameter update $$u_i^{(t)} + \frac{\alpha}{N\sigma^2} \sum_{j=1}^{N} a_{ij} \cdot (R(\theta_j^{(t)} + \sigma\epsilon_j^{(t)}) \cdot ((\theta_j^{(t)} + \sigma\epsilon_j^{(t)}) - (\theta_i^{(t)})))$$

as per Equation 2, the following relation holds:

$$\text{Var}_i[u_i^{(t)}] \leq \frac{\max^2 R(\cdot)}{N\sigma^4} \qquad \text{(Eq. 3)}$$

$$\left\{ \left( \frac{\|A^2\|_F}{(\min_l |A_l|)^2} \right) \cdot f(\Theta, \mathcal{E}) - \left( \frac{\min_l |A_l|}{\max_l |A_l|} \right)^2 \cdot \frac{\sigma^2}{N} \left( \sum_{i,j} \epsilon_i^{(t)} \epsilon_j^{(t)} \right) \right\}$$

In Equation 3, $$|A_l| = \sum_j a_{jl},$$

and $\|A^2\|_F$ is the Frobenius norm of $A^2$, and $$f(\Theta, \mathcal{E}) = \sqrt{\left( \sum_{j,k,m} ((\theta_j^{(t)} + \sigma\epsilon_j^{(t)} - \theta_m^{(t)}) \cdot (\theta_k^{(t)} + \sigma\epsilon_k^{(t)} - \theta_m^{(t)}))^2 \right)}.$$

The variance $\text{Var}_i[u_i^{(t)}]$ in Equation 3 is not the variance of the value function gradient, which is typically minimized in reinforcement learning. Instead, $\text{Var}_i[u_i^{(t)}]$ in Equation 3 is the variance in the positions in parameter space of the agents after a step of the NetES algorithm. This quantity is akin to a radius of exploration for a distributed search procedure. In some cases, the search radius of positions in parameter space is maximized to find high-performing parameters.

By Equation 3, we see that the diversity of exploration in the parameter updates across agents is affected by two quantities that involve the connectivity matrix A: reachability and homogeneity. As used herein, the "reachability" of a network means $(\|A^2\|_F / (\min_l |A_l|))^2$ (using the same math notation with the same meaning as in Equation 3). As used herein, the "homogeneity" of a network means $(\min_l |A_l| / \max_l |A_l|)^2$ (using the same math notation with the same meaning as in Equation 3).

In some implementations of this invention, the performance of a group of reinforcement learning agents is maximized by maximizing reachability and by minimizing homogeneity. In some implementations, it is desirable to minimize homogeneity in order to maximize the diversity of parameter updates across agents. In some implementations of this invention, reachability and homogeneity are not independent and are statistics of the degree distribution of a graph.

Reachability is the squared ratio of the total number of paths of length 2 in A to the minimum number of links of all nodes of A. The sparser a network, the larger the reachability. For Erdos-Renyi graphs, $(\|A^2\|_F / (\min_l |A_l|))^2 \approx (pN)^{-1/2}$, where p is the average density of the network (the inverse of sparsity), the probability that any two nodes being connected.

Homogeneity is the squared ratio of the minimum to maximum connectivity of all nodes of A: the higher this value, the more homogeneously connected the graph is. The sparser a network is, the lower is the homogeneity of a network. In the case of Erdos-Renyi networks, $(\min_i |A_i|/\max_i |A_i|)^2 \approx 1 - 8\sqrt{(1-p)/(Np)}$.

In some cases, out of four network families (Erdos-Renyi, scale-free, small-world, and fully-connected): (1) Erdos-Renyi networks maximize reachability and minimize homogeneity, which means that they maximize the diversity of parameter exploration; and (2) fully-connected networks (which are the de facto communication network used for distributed learning) are the worst network in terms of exploration diversity (they minimize reachability and maximize homogeneity, the opposite of what would be required for maximizing parameter exploration).

Early Tests

The following twenty paragraphs describe early tests of prototypes of this invention.

In these early tests: (a) a variety of network topologies were tested; and (b) DRL agents performed better in sparse network topologies than in more dense network topologies.

These early tests used OpenAI's Roboschool 3D Humanoid Walker (specifically, RoboschoolHumanoid-v1, shown in FIG. 1), an open-source implementation of MuJoCo.

To run the early tests, we generated a large set of canonical network topologies, as well as a set of engineered topologies that were designed to isolate various network statistics. We fixed the number of nodes (agents) to be 1000. We generated a population of Erdos-Renyi random graphs by varying the routine's main parameter, p. Erdos-Renyi random graphs are constructed by connecting each pair of possible nodes at random with probability p. We ensured that the network consisted of only one component (i.e. that there are no disconnected nodes or components in the network).

In these early tests, we employed random partition graph generation (as described above) to generate engineered graphs. Each of these engineered graphs comprised a number of smaller Erdos-Renyi clusters connected to each other.

In these early tests, we created a baseline by running fully-connected networks of 1000 agents using OpenAI's original ES code ten times. We then fitted each run using a logistic growth function. We used the higher asymptote as a measure of maximum reward for each run, and then used the average of these maximum asymptotic rewards as a measure of performance, henceforth referred to as the baseline.

In these early tests, we then ran the NetES algorithm with a variety of different network topologies, and compared the resulting performance to the baseline.

In these early tests, we then ran all our network variants (both in terms of topology and attributes) and similarly obtained a measure of the mean asymptotic reward. We computed these asymptotes over the same number of iterations to maintain comparability of results, and we also ensured that rewards stabilized over time to an asymptote in order to get an accurate observation of maximum achieved reward.

FIGS. 3, 4, 5, 6, 7 and 8 summarize results of the early tests.

Figure 3:
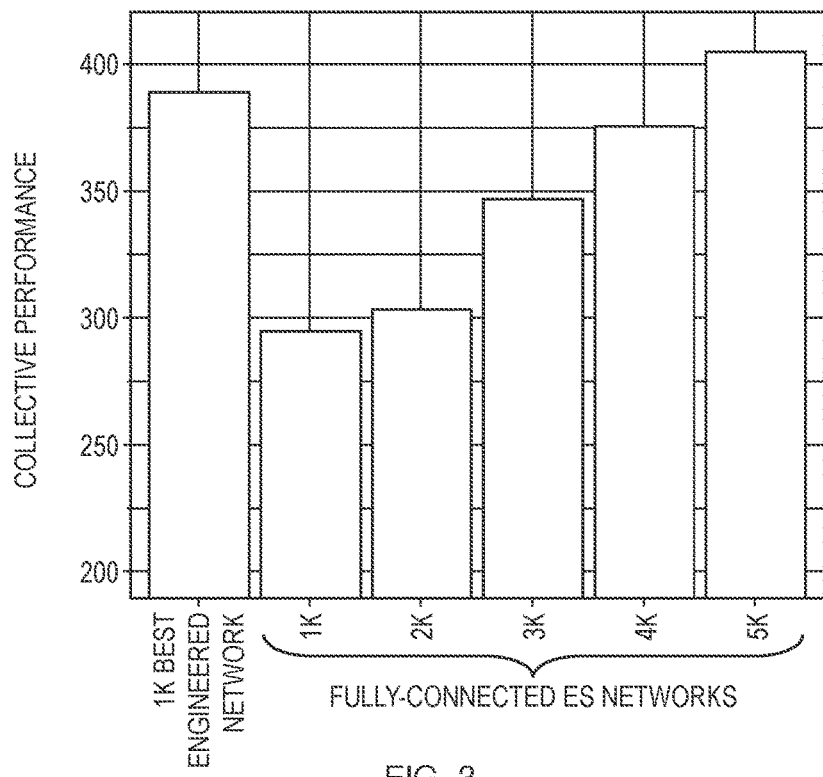
FIG. 3 is a chart that shows performance of different networks.

FIG. 3 shows performance of different network topologies. Specifically, FIG. 3 shows that 1000 agents arranged in an engineered network (using a NetES algorithm) performed better than up to 4000 agents arranged in a conventional fully-connected ES network. As can be seen in FIG. 3, an engineered network with 1000 agents not only beat fully-connected networks with a similar number of agents (processors), but beat 4000 agents arranged in a fully-connected network. This increase in efficiency may due to the vastly larger parameter space being explored by each local neighborhood.

Figure 4:
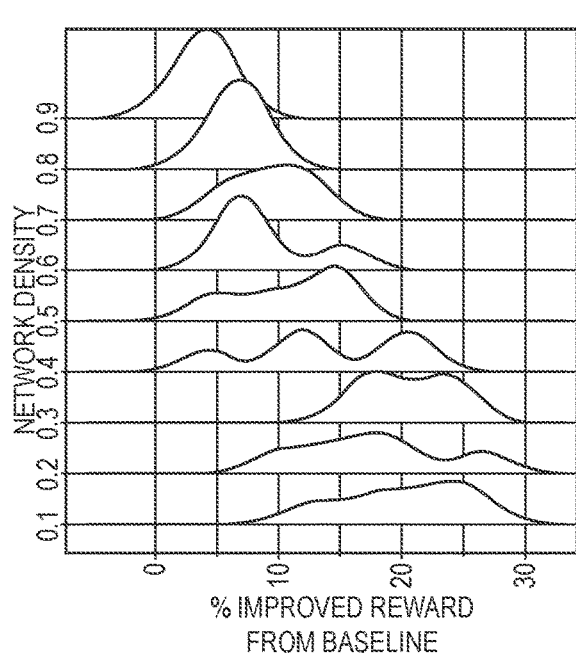
FIG. 4 is a chart that shows a percent improvement of reward, as a function of network density.
Figure 5:
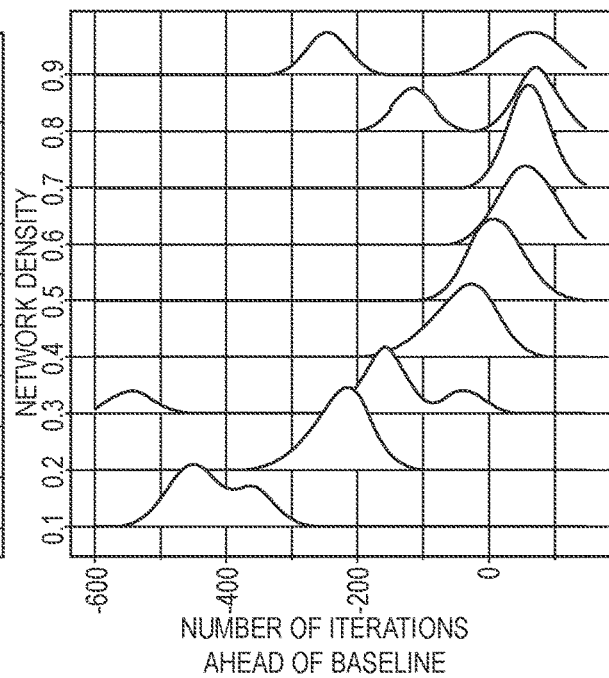
FIG. 5 is a chart that shows learning rate as a function of network density.

The distribution of reward (in FIG. 4) and learning rate (in FIG. 5) over several repeated runs of the NetES algorithm varied strongly with the density of Erdos-Renyi networks. In FIG. 4, reward is calculated as the improvement from baseline. In FIG. 5, learning rate is calculated as the number of iterations ahead of the fully-connected network to reach baseline reward.

FIG. 4 shows a percent improvement of reward, as a function of network density, as observed in the early tests. As shown in FIG. 4, Erdos-Renyi networks achieved up to a 26% increase from the baseline reward. As the networks became denser, the average improvement compared to baseline decreases, approaching zero as networks become close to fully-connected. A random graph with an average density of 0.9 still does 5% better than a baseline network (which has a density of 1.0).

FIG. 5 shows learning rate as a function of network density, as observed in the early tests. Fully-connected networks took about 320 iterations to reach their asymptotic maximum result; whereas our fastest network reached that value in only 220 iterations (and kept learning), an improvement of 32%.

In the early tests, we observed that denser networks tend to learn faster, but the relationship is not monotonic: as the network approaches being fully connected, the distribution flattens and the average learning rate decreases. This increase in speed may be due to the fact that the separate network neighborhoods of agents are able to visit a larger number of parameters in parallel, and hence can find higher maxima faster. Because the NetES algorithm also implements a probabilistic broadcast, which may set the parameters of all agents to those of the highest-performing agent with probability $\beta$ at the end of each iteration, the NetES algorithm may ensure that the network tends to converge to better-performing parameters. In the NetES algorithm, networked decentralization strikes a balance between increased parameter exploration diversity and global communication.

Figure 6A:
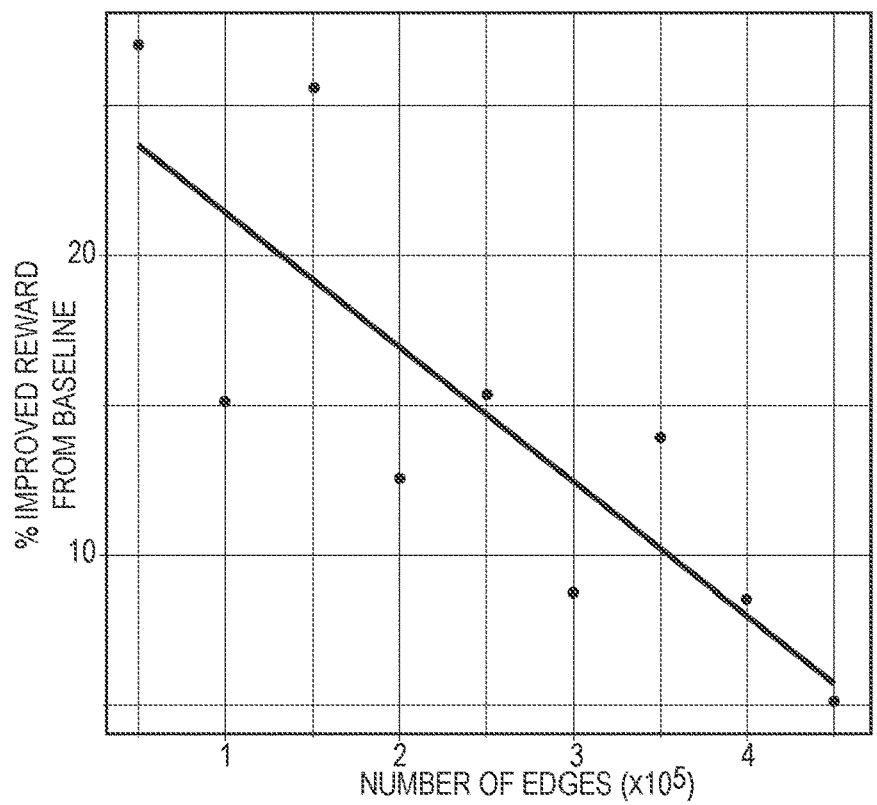
FIG. 6A is a chart that shows a percent improved reward as a function of number of edges.
Figure 6B:
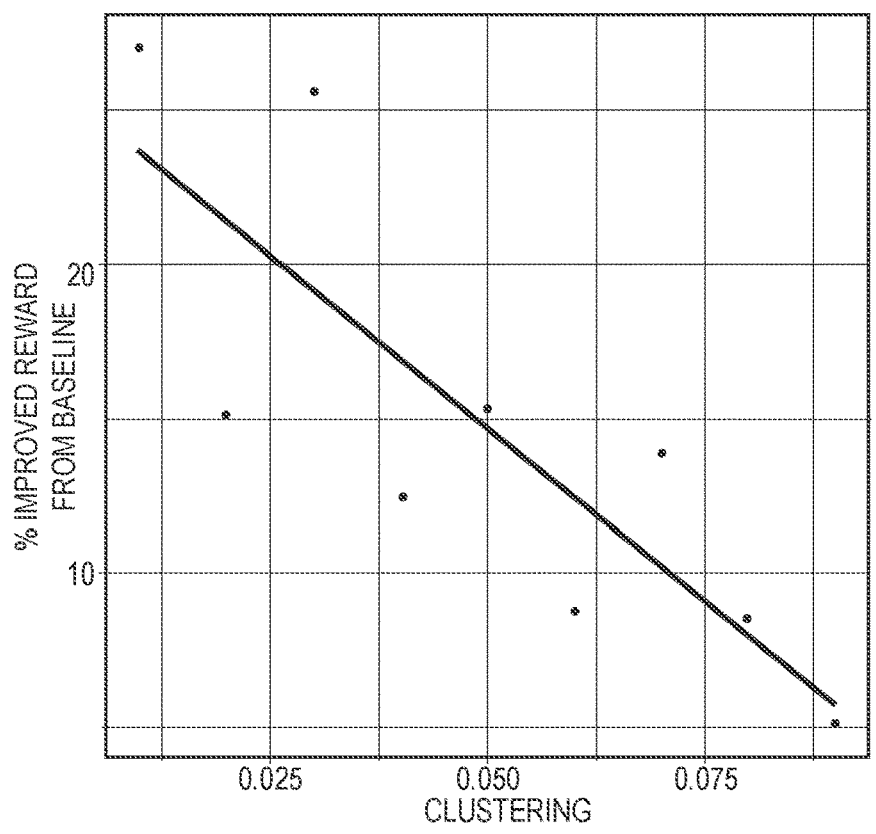
FIG. 6B is a chart that shows a percent improved reward as a function of clustering.
Figure 6C:
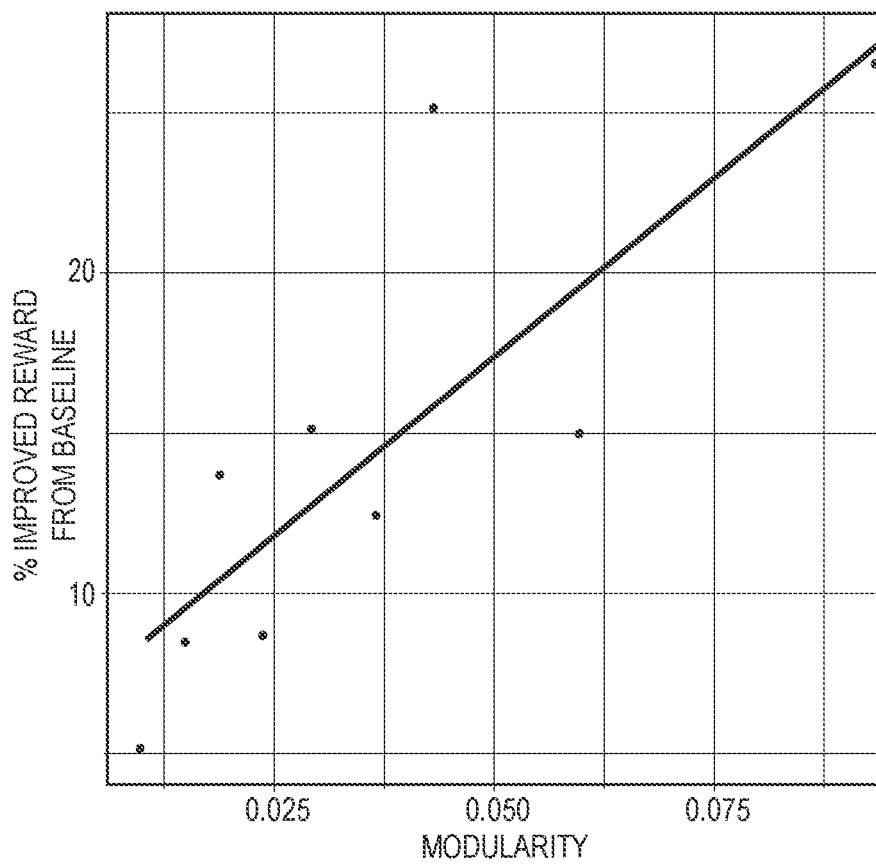
FIG. 6C is a chart that shows a percent improved reward as a function of modularity.

In some of the early tests, we calculated network metrics across all 1000 nodes in each Erdos-Renyi network. We found strong correlations between these network metrics and reward, as shown in FIGS. 6A, 6B and 6C. Specifically, we found that as the number of edges (communication between agents) increases, the reward decreases (FIG. 6A). This decline may be because, as communication increases, the local neighborhoods become less isolated from one another and the diversity of parameters being explored decreases. This, in turn, may lead to lower rewards (closer to baseline). Clustering is a measure of how many of the neighbors of each node form a closed triangle, and is therefore a super-local measure of connectedness. We find that as clustering increases, rewards decrease (FIG. 6B). Modularity, a measure of inter-neighborhood global connectedness, also correlates with higher rewards (FIG. 6C).

FIG. 6A shows that in Erdos-Renyi networks, performance increases as the number of edges of the of network decreases. FIG. 6B shows that in Erdos-Renyi networks, performance improves as the clustering of the network decreases. FIG. 6C shows that in Erdos-Renyi networks, performance improves as the modularity of the network increases. In FIGS. 6A, 6B and 6C, performance is measured as percent improved reward from the baseline (described above).

FIGS. 6A, 6B and 6C show that, in Erdos-Renyi networks, sparsity at both the local neighborhood level and at a global inter-cluster level may lead to higher rewards. In the early tests, we observed that sparser networks—at both the local and global level—learn faster and achieve higher rewards than baseline, and with less communication cost (less dense networks have less edges, and hence lower communication between nodes).

Figure 7:
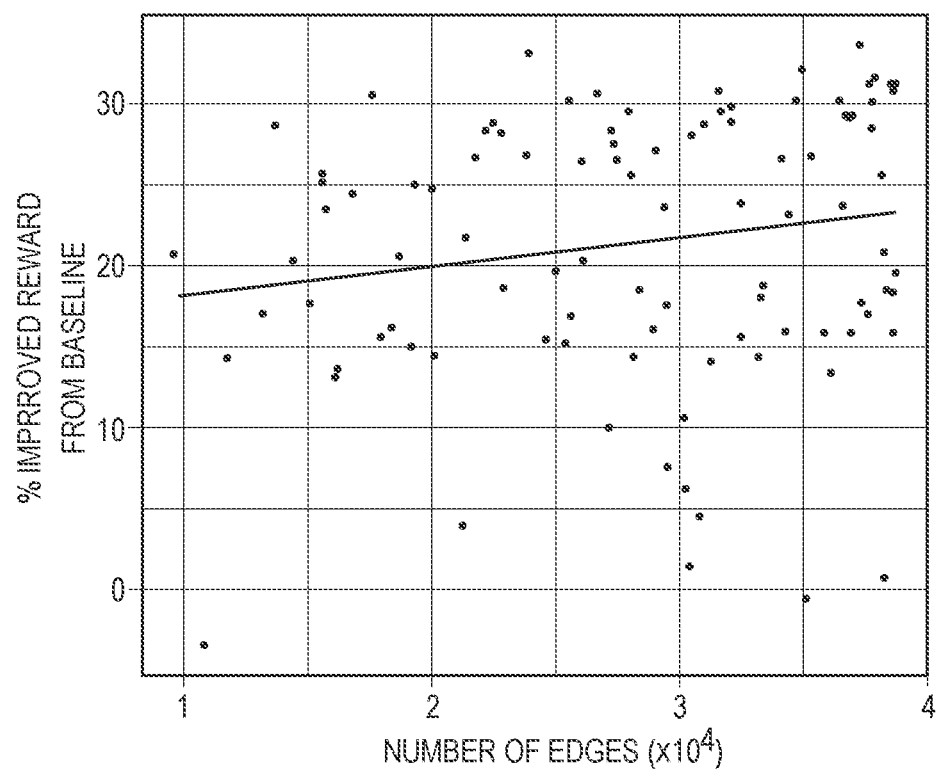
FIG. 7 is a chart that shows percent improved reward as a function of number of edges, in engineered networks.

FIG. 7 shows percent improved reward from baseline, as a function of number of edges, in engineered networks, as observed in the early tests.

Figure 8:
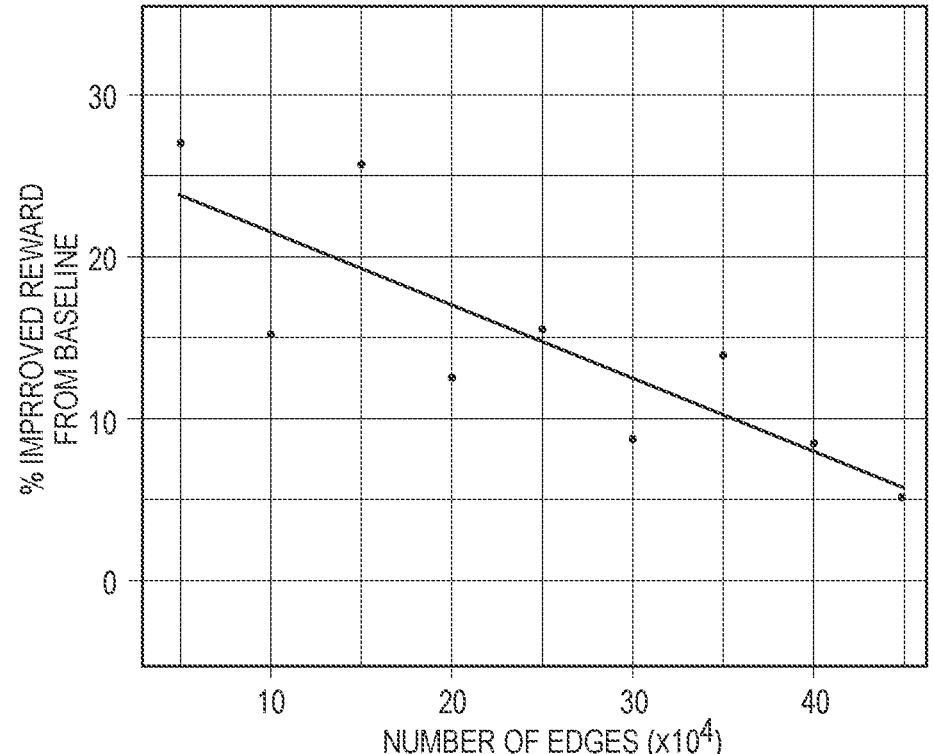
FIG. 8 is a chart that shows percent improved reward as a function of number of edges, in Erdos-Renyi random networks.

FIG. 8 shows percent improved reward from baseline, as a function of number of edges, in Erdos-Renyi random networks, as observed in the early tests. FIG. 8 indicates that, in Erdos-Renyi random networks, lower communication (edge counts) lead to higher reward.

In the early tests, we tested engineered network topologies (that are the subject of FIG. 7) that each have an even smaller number of edges than the number of edges of the Erdos-Renyi networks (that are the subject of FIG. 8). We found that (in the networks whose performance is summarized in FIGS. 7 and 8) engineered networks show increased rewards: 26% for the highest Erdos-Renyi network compared to 33.5% for the best engineered graph. Interestingly, the relationship was non-monotonic: the trends in rewards with respect to the number of edges in Erdos-Renyi and engineered networks are opposite to one another. This may, perhaps, be because under a certain threshold number of edges, agents are no longer able to communicate efficiently within their thinned neighborhood and good gradients are not being communicated to neighbors who end up relying more on their very few neighbors' rewards, which in turn leads to ineffective search.

In the early tests, we found the same non-monotonic behavior for average path length, clustering (local connectedness), and modularity (global sparsity). In the early test, although the best engineered networks still do better than Erdos-Renyi graphs, rewards decrease if network connectedness decreases too much. In such cases, even extremely high broadcast probabilities do not allow such overly-thinned networks to learn. In the early tests, the larger scattering variance in the generated network rewards may due to the fact that we ran each engineered network only once (to allow for our greater exploration of engineered topologies), instead of running repeated experiments for each topology, which we do for Erdos-Renyi and fully-connected networks.

Later Tests

The following 19 paragraphs describe later tests of prototypes of this invention.

In these later tests, the NetES algorithm was employed with each of four families of network topologies (in addition to a conventional fully-connected de facto topology): (1) Erdos-Renyi (ER) networks; (2) scale-free networks; (3) small-world networks; and (4) fully-connected networks (where every node is connected to every other node). Each of these network families may be parametrized by the number of nodes N, and their degree distribution. Erdos-Renyi networks, for example, are parametrized by their average density p ranging from 0 to 1, where 0 would lead to a completely disconnected graph (no nodes are connected), and 1.0 would lead back to a fully-connected graph. The lower p is, the sparser a network is. Similarly, the degree distribution of scale-free networks is defined by the exponent of the power distribution. Because each graph is generated randomly, two graphs with the same parameters will be different if they have different random seeds, even though, on average, they will have the same average degree (and therefore the same number of links).

In these later tests, the NetES algorithm was evaluated on a series of popular benchmarks for deep reinforcement learning tasks, selected from two frameworks: (a) the open source Roboschool benchmark, and (b) the MuJoCo framework. The five benchmark tasks used for evaluation were: Humanoid-v1 (Roboschool and Mujoco), HalfCheetah-v1 (MuJoCo), Hopper-v1 (MuJoCo) and Ant-v1 (MuJoCo).

In these later tests, we used a standard evaluation metric of collecting the total reward agents collect in an episode, which we computed periodically during training. Specifically, with a probability of 0.08, we paused training, took the parameters of the best agent and ran this parameter (without added noise perturbation) for 1000 episodes, and took the average total reward over all episodes. After evaluation, training was resumed with the same pre-evaluation parameters (i.e. evaluation did not change training parameters). When training eventually stabilized to a maximum "flat" line, we recorded the maximum of evaluation performance values (averaged over all episodes) during this "flat" period as our recorded performance for this particular experimental run.

In these later tests, we then repeated the former evaluation procedure for different instances of the same network topology (by varying the random seed of network generation, we can create, at the start of each experiment, a different network topology with the same global properties) with the same average density p (i.e. the same average number of links) and the same number of nodes N. Since each node runs the same number of episode time steps per iteration, different networks with the same p can be fairly compared. We then report the average performance over 6 runs with 5-95% confidence intervals.

In these later tests, we employed the following neural network architecture: multilayer perceptrons with two 64-unit hidden layers separated by tanh nonlinearities. In these later tests, we also: (1) trained for one complete episode for each iteration; (2) employed antithetic or mirrored sampling, also known as mirrored sampling, where we explored $\epsilon_i^{(t)}$, $-\epsilon_i^{(t)}$ for every sample $\epsilon_i^{(t)} \sim \mathcal{N}(0,1)$; (3) employed fitness shaping by applying a rank transformation to the returns before computing each parameter update, and (4) employed weight decay in the parameters for regularization. In these later tests, we also employed the same hyperparameters as an original OpenAI (fully-connected and centralized) implementation, varying only the network topology for our experiments.

In these later tests, the NetES algorithm using alternative network topologies took approximately the same wall-clock time as when using a fully-connected network (baseline ES): although each iteration using NetES took longer because of increased communication (about 60 seconds for NetES versus 50 seconds for ES with 1000 agents each), NetES is still superior because the 1000 NetES agents learned at the roughly the same (higher) performance level as 3000 ES agents (which took more than 2 minutes).

In these later tests, we use an average network density of 0.2 for all network families and sizes of networks because it is sparse enough to provide good learning performance, and consistent (not noisy) empirical results.

In these later tests, using the MuJoCo Ant-v1 benchmark task (because it runs the fastest), we ran a series of experiments on four different network families: Erdos-Renyi, scale-free, small-world and the conventional fully-connected network. In these later tests, for a given average density, all networks from all topological families had the same approximate number of links (and nodes) and only the distribution of links (degree distribution) varied. Because these later tests were exploratory experiments, we chose to run on smaller networks (number of agents, N=100).

In these later tests, Erdos-Renyi outperformed all other network families, and fully-connected networks (the de facto traditional network) performed worst.

In these later tests, using Erdos-Renyi networks, we ran larger networks of 1000 agents on all 5 benchmark results. Table 1 shows a summary of improvements for Erdos-Renyi networks with 1000 nodes compared to fully-connected networks.

As can be seen in Table 1, the Erdos-Renyi networks outperformed fully-connected networks on all benchmark tasks, resulting in improvements ranging from MuJoCo 9.8% on Ant-v1 to 798% on MuJoCo Humanoid-v1. All results are statistically significant (based on 5-95% confidence intervals).

TABLE 1

| Type | Task | Fully-connected | Erdos | Improvement % |
|---|---|---|---|---|
| MuJoCo | Ant-v1 | 4496 | 4938 | 9.8 |
| MuJoCo | HalfCheetah-v1 | 1571 | 7014 | 346.3 |
| MuJoCo | Hopper-v1 | 1506 | 3811 | 153.1 |
| MuJoCo | Humanoid-v1 | 762 | 6847 | 798.6 |
| Roboschool | Humanoid-v1 | 364 | 429 | 17.9 |

In these later tests, the difference in performance between Erdos-Renyi and fully-connected networks was higher for smaller networks compared to larger networks) for the same benchmark—and we observed this behavior across different benchmarks. This may be because NetES is able to achieve higher performance with fewer agents due to its efficiency of exploration.

So far, in the discussion of the later tests, we have compared alternative network topologies with fully-connected networks containing the same number of agents.

In the later tests, we also investigated whether smaller Erdos-Renyi networks can outperform larger fully-connected networks. To do this, we chose one of the benchmarks that has the lowest improvement for 1000 agents, Roboschool Humanoid-v1. We observed that an Erdos-Renyi network with 1000 agents provides comparable performance to 3000 agents arranged in a fully-connected network. This shows that, in some of the later tests, networks with alternative topologies not only provided improvements over fully-connected networks, but also had a multiplicative effect on performance.

As noted above, the NetES is an improvement over the ES algorithm. NetES may be used with a wide variety of network topologies that ES cannot use.

As noted above, NetES differs from the ES algorithm in certain features, such as stochastic broadcast and each agent having its own parameter set. In some of the later tests, we evaluated whether these features were causing improvements in performance instead of just the use of alternative network topologies. We ran control experiments on two of these features, namely: (a) the use of broadcast, (b) the fact that each agent/node has a different parameter set.

Net ES may implement parameter broadcast as follows: at every iteration, with a probability $p_b$, all agents' current parameters are replaced with the best agent's performing weights, and then training continues after that (as per Equation 2). In some of the later tests, we evaluated whether broadcast (over different probabilities ranging from 0.0 to 1.0) contributes significantly to learning. Specifically, we compared "disconnected" networks where agents can only learn from their own parameter update (they do not see the rewards and parameters of any other agents) and from broadcast with our Erdos-Renyi network and fully-connected networks of 1000 agents on the Roboschool Humanoid-v1 task. We observed that very little learning happens with just broadcast. This indicates that, in the later experiments, broadcast did not drive the learning performance improvement we observed when using alternative topologies. In the later experiments, broadcast was treated as a hyperparameter and fixed as 0.8.

As noted above, in NetES, each agent may hold its own parameter set $\theta_i^{(t)}$ instead of a global (noised) parameter $\theta^{(t)}$. In some of the later experiments, we created the following 4 control baselines for fully-connected ES with 100 agent running: (1) same global parameter, no broadcast; (2) same global parameter, with broadcast; (3) different parameters, with broadcast; (4) different parameters, no broadcast. We then compared these four control baselines to NetES running an Erdos-Renyi network. NetES did better than all 4 other control baselines on MuJoCo Ant-v1.

In some of these later tests, we generated large instances of networks (using N=100) from different families of networks (fully connected, Erdos-Renyi, scale-free, and small-world), and observed that Erdos-Renyi graphs maximize the diversity of parameter updates. We observed that Erdos-Renyi networks perform best, followed by scale-free networks, while fully-connected networks do worse.

Practical Applications:

In some implementations, this invention may be employed in any sparse, decentralized network.

This invention may achieve faster and higher decentralized learning with much cheaper communication costs in practical networks of AI (artificial intelligence) agents.

In some cases, this invention may be employed for massively distributed learning, such as across entire fleets of autonomous vehicles or mobile phones that learn from each other instead of requiring a master to coordinate learning. Because of geographic location, such sparse networks of communication between autonomous vehicles and mobile phones may occur naturally.

For instance, in some implementations of this invention, each vehicle in a fleet of autonomous vehicles may include a processor that is a DRL agent. Each of these processors may be a node in a sparse, decentralized network of DRL agents. The fleet of autonomous vehicles may perform massively distributed DRL (or another AI algorithm).

For instance, in some implementations of this invention, cellphones may be nodes in a network and the local learning update may be communicated within a local neighborhood via Bluetooth® with occasional global broadcast via long-range data communication (3G, 4G, Edge®, etc.). The network of cellphones may perform massively distributed DRL (or another AI algorithm)

In contrast, using a fully-connected architecture requiring a master in such a naturally decentralized application (e.g., a fleet of autonomous vehicles, or a network of cell phones) would be both impractically costly, and would lead to slower and lower learning.

Agents

In some implementations of this invention, parallel computations perform deep reinforcement learning (e.g., perform a NetES algorithm).

In some implementations of this invention, the computations for the learning agents are performed by multiple processors or computing cores in a decentralized network. In some cases, each individual processor or core in the network performs computations for a single reinforcement learning agent. In some cases, the multiple cores or processors in the network are each housed in a separate device, such as in a cellphone, mobile phone, smartphone, autonomous vehicle, drone, or robot. In some cases, the multiple cores or processors in the network are components of one or more multi-core processors. In some cases, the multiple cores or processors in the network are components in one or more (a) clusters of computers, (b) distributed computers (e.g., distributed memory multiprocessors), (c) MPPs (massively parallel processors), or (d) SMPs (symmetric multi-processors). In some cases, each core or processor in the network is housed in a separate computer. In some cases, memory in the network is physically distributed, such as in a NUMA (non-uniform memory access) network.

In some implementations of this invention: (a) the nodes of the decentralized network are processors or cores that each perform computations for a DRL agent; and (b) the nodes are communicatively linked to each other via one or more wired, wireless or fiber optic communication links (e.g., via the Internet, or via wireless communication, or via fiber optic communication).

In some implementations, each reinforcement learning agent is a node in the network. For instance, each learning agent in FIG. 1B may be a node in a decentralized network. Likewise, each node (e.g., 101 and 103) in FIG. 1C may be a node in a decentralized network.

Computer Readable Media, Etc.

In some implementations, this invention comprises one or more computer that are programmed to perform one or more of the Computer Tasks (as defined herein).

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Software

In the Computer Program Listing above, 67 computer files are listed. These 67 computer files comprise software employed in a prototype of this invention.

In order to comply with requirements for uploading computer program files to the USPTO web site, changes were made to the file extensions of each of the 67 computer files and to the names of some of the files.

These changes may be reversed, in order to use these computer files. Specifically:

(1) In order to run the following computer program files, their file extensions may be changed from ".txt" to ".py": agent_updaters.txt; dist.txt; es.txt; main.txt; multi.txt; networks.txt; optimizers.txt; policies.txt; tabular_logger.txt; tf_util.txt; experiment_generator_small_networks_mujoco_erdos_ontheflytopo.txt; networks_generator.txt; launch.txt; viz.txt; watch_master_process.txt; deploy.txt; and request.txt.

(2) In order to employ the following files: (a) their file extensions may be changed from ".txt" to ".json"; (b) the characters "v1" may (each that they appear in the names of the following files) be replaced with "-v1"; (c) the characters "0_1", "0_2", 0_3", "0_4", "0_5", "0_6", "0_7", "0_8" and "0_9" may (each that they appear in the names of the following files) be replaced with "0.1", "0.2", 0.3", "0.4", "0.5", "0.6", "0.7", "0.8" and "0.9", respectively; and (d) the phrase "Neighborhoodfully_connected" may (each that itappears in the names of the following files) be replaced with the following phrase "Neighborhoodfully-connected":
Ant_v1_Neighborhooderdos0_2num_agents1000_broadcastp_0_8_threads_120.txt;
HalfCheetah_v1_Neighborhooderdos0_2num_agents1000_broadcastp_0_8_threads_120.txt;
Hopper_v1 Neighborhooderdos0_2num_agents1000_broadcastp_0_8_threads_120.txt;
Humanoid_v1_Neighborhooderdos0_2num_agents1000_broadcastp_0_8_threads_120.txt;
HumanoidStandup_v1_Neighborhooderdos0_2num_agents1000_broadcastp_0_8_threads_120.txt;
Swimmer_v1_Neighborhooderdos0_2num_agents1000_broadcastp_0_8_threads_120.txt;
Neighborhood_selfloop_pselfloop_num_agents1000_broadcastp_0_1_threads_120.txt;
Neighborhood_selfloop_pselfloop_num_agents1000_broadcastp_0_2_threads_120.txt;
Neighborhood_selfloop_pselfloop_num_agents1000_broadcastp_0_3_threads_120.txt;
Neighborhood_selfloop_pselfloop_num_agents1000_broadcastp_0_4_threads_120.txt;
Neighborhood_selfloop_pselfloop_num_agents1000_broadcastp_0_5_threads_120.txt;
Neighborhood_selfloop_pselfloop_num_agents1000_broadcastp_0_6_threads_120.txt;
Neighborhood_selfloop_pselfloop_num_agents1000_broadcastp_0_7_threads_120.txt;
Neighborhood_selfloop_pselfloop_num_agents1000_broadcastp_0_8_threads_120.txt;
Neighborhood_selfloop_pselfloop_num_agents1000_broadcastp_0_9_threads_120.txt;
Neighborhood_selfloop_pselfloop_num_agents1000_broadcastp_0_threads_120.txt;
Neighborhood_selfloop_pselfloop_num_agents1000_broadcastp 1_threads_120.txt;
Ant_v1_Neighborhoodfully_connected_num_agents100 broadcastp_0_0_threads_120.txt;
Ant_v1_Neighborhoodscalefreem4 num_agents100 broadcastp_0_8_threads_120.txt;
HalfCheetah_v1_Neighborhoodfully connected num_agents100 broadcastp_0_0_threads_120.t xt;
HalfCheetah_v1_Neighborhoodscalefreem4 num_agents100 broadcastp_0_8_threads_120.txt;
Hopper_v1_Neighborhoodfully_connected_num_agents100 broadcastp_0_0_threads_120.txt;
Hopper_v1_Neighborhoodscalefreem4 num_agents100 broadcastp_0_8_threads_120.txt;
Humanoid_v1_Neighborhoodfully_connected_num_agents100 broadcastp_0_0_threads_120.txt;
Humanoid_v1_Neighborhoodscalefreem4 num_agents100 broadcastp_0_8_threads_120.txt; vanilla_1K.txt; vanilla_2K.txt; vanilla_3K.txt; vanilla_4K.txt; vanilla_5K.txt; vanilla_6K.txt; vanilla_7K.txt; vanilla_8K.txt; vanilla_9K.txt; experiment_template.txt; and packer.txt.

(3) In order to run the following programs, their file extensions may be changed from ".txt" to ".sh": install_bullet.txt; dependency.txt; local_env_setup.txt; local_run_exp.txt; local_run_redis.txt; watch_master_redis.txt; watch_worker_process.txt; watch_worker_redis.txt; start_local.txt; and test_local.txt. Furthermore, the "_" in install bullet.txt may be replaced with "_".

(4) In order to employ the following configuration files, their file extensions may be changed from ".txt" to ".conf": redis_local_mirror.txt; and redis_master.txt.

(5) In order to employ the following file, its file extension may be changed from ".txt" to ".yml" and the "_" in its name may be changed to "-": es_network.txt.

(6) In order to employ the following file, the ".txt" file extension may be deleted: ec2ctl.txt.

In some cases, all or part of the above 67 computer files are software for running and deploying NetES. In some cases: (a) a conda environment may be created using the following command on remote instances "conda env create-f es-network.yml"; (b) AWS instances may be requested using "python request.py NUM INSTANCES"; (c) JSON experiments may be deployed to AWS instances using "python deploy.py configurations_DIR—aws_request_dir aws_requests_DIR"; and (d) network graph files may be created either on-the-fly using the appropriate JSON configs or (for static testing) using network networks_generator.py.

This invention is not limited to the software set forth in the above 67 computer files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to perform deep reinforcement learning (such as by performing the NetES algorithm, ES algorithm, Gorila algorithm or A3C algorithm) or to perform any other machine learning; (2) to calculate a network topology; (3) to maximize or improve the performance of a group of reinforcement learning agents by optimizing or improving a communication topology between the agents for the communication of gradients, weights or rewards; (4) to receive data from, control, or interface with one or more sensors; (5) to perform any other calculation, computation, program, algorithm, or computer function described or implied herein; (6) to receive signals indicative of human input; (7) to output signals for controlling transducers for outputting information in human perceivable format; (8) to process data, to perform computations, and to execute any algorithm or software; and (9) to control the read or write of data to and from memory devices (tasks 1-9 of this sentence referred to herein as the "Computer Tasks"). The one or more computers (e.g., the learning agents in FIG. 1A or 1B, or nodes 101 and 103 in FIG. 1C) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., (e.g., the learning agents in FIG. 1A or 1B, or nodes 101 and 103 in FIG. 1C) are each configured for wireless or wired communication with other devices in a network.

For example, in some cases, one or more of these electronic devices each include a wireless module for wireless communication with other devices in a network. Each wireless module include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., the learning agents in FIG. 1A or 1B, or nodes 101 and 103 in FIG. 1C) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (Wi-Fi®), IEEE 802.15 (Bluetooth®/Zigbee®), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTE (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

To compute "based on" specified data means to perform a computation that takes the specified data as an input.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

"DRL" means deep reinforcement learning.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

"ES" means Evolution Strategies.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

As used herein, "graph" means a network.

"Herein" means in this document, including text, specification, claims, abstract, and drawings.

"Homogeneity" is defined above.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"NetES" means Networked Evolution Communication Strategies.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Reachability" is defined above.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising maximizing performance of a network of reinforcement learning agents by optimizing communication topology between the agents for communication of gradients, weights or rewards. In some cases, the network is a random Erdos-Renyi graph. In some cases, the network is a random Erdos-Renyi network; and (b) the optimizing comprises minimizing homogeneity of the network and maximizing reachability of the network. In some cases, the network is not fully connected. Each of the cases described above in this paragraph is an example of the method described in the first sentence of this paragraph, and is also an example of an embodiment of this invention that may be combined with other embodiments of this invention.

In some implementations, this invention is a method comprising improving performance of a network of reinforcement learning agents by improving communication topology between the agents for communication of gradients, weights or rewards. In some cases, the network is a random Erdos-Renyi graph. In some cases: (a) the network is a random Erdos-Renyi network; and (b) the improving of the communication topology comprises reducing homogeneity of the network and increasing reachability of the network. In some cases, the improving topology comprises: (a) evaluating performance, in one or more reinforcement learning tasks, of each network topology in a set of multiple different network topologies; (b) based on the evaluating, selecting a specific network topology in the set; and (c) then using the specific network topology to perform a reinforcement learning algorithm. In some cases, the network is not fully connected. Each of the cases described above in this paragraph is an example of the method described in the first sentence of this paragraph, and is also an example of an embodiment of this invention that may be combined with other embodiments of this invention.

In some implementations, this invention is a method comprising performing a reinforcement learning algorithm on a network wherein: (a) the network includes multiple nodes, each node being a reinforcement learning agent; (b) each agent has its own parameter set; and (c) in each specific iteration in a set of iterations of the reinforcement learning algorithm, each specific agent in the network performs an update of the specific agent's parameter set in such a way that (i) the update is based on information regarding only a subset of the nodes in the network, which subset consists of less than 15% of the nodes in the network, and (ii) the update is performed separately from that for any other node in the network. In some cases, the subset consists of less than 10% of the nodes in the network. In some cases, the subset consists of less than 5% of the nodes in the network. In some cases, the method further includes performing with a fixed probability, in each specific iteration in a set of iterations of the reinforcement learning algorithm, a broadcast of a parameter set ("broadcast parameter set") in such a way that each specific agent in the network updates the specific agent's parameter set with the broadcast parameter set. In some cases: (a) the method further includes performing with a fixed probability, in each specific iteration in a set of iterations of the reinforcement learning algorithm, a broadcast of a parameter set ("broadcast parameter set") in such a way that each specific agent in the network updates the specific agent's parameter set with the broadcast parameter set; and (b) the probability is greater than or equal to 0.5. In some cases, the network is a random Erdos-Renyi graph. In some cases: (a) the network is a random Erdos-Renyi graph; (b) each specific pair of nodes in the graph has a fixed probability of being connected by an edge of the graph, which edge connects a node in the specific pair with another node in the specific pair; and (c) the probability is less than 0.6. In some cases, the network is not fully connected. In some cases: (a) the network comprises a multiple clusters of nodes; and (b) some but not all nodes in each specific cluster are connected by an edge to a node in another cluster in the set of clusters. In some cases: (a) each reinforcement learning agent is a processor or computational core; and (b) each reinforcement learning agent is housed in a device that is separate from that for any other reinforcement learning agent. In some cases: (a) each reinforcement learning agent is a processor or computational core; (b) each reinforcement learning agent is housed in a device that is separate from that for any other reinforcement learning agent; and (c) the device is a vehicle or a cellular phone. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising performing a reinforcement learning algorithm on a network wherein:
   (a) the network includes multiple nodes, each node being a reinforcement learning agent;
   (b) each agent has its own parameter set; and
   (c) in each specific iteration in a set of iterations of the reinforcement learning algorithm, each specific agent in the network performs an update of the specific agent's parameter set in such a way that
      (i) the update is based on information regarding only a subset of the nodes in the network, which subset consists of less than 15% of the nodes in the network, and
      (ii) the update is performed separately from that for any other node in the network.

2. The method of claim 1, wherein the subset consists of less than 10% of the nodes in the network.

3. The method of claim 1, wherein the subset consists of less than 5% of the nodes in the network.

4. The method of claim 1, wherein the method further includes performing with a fixed probability, in each specific iteration in a set of iterations of the reinforcement learning algorithm, a broadcast of a parameter set ("broadcast parameter set") in such a way that each specific agent in the network updates the specific agent's parameter set with the broadcast parameter set.

5. The method of claim 1, wherein:
(a) the method further includes performing with a fixed probability, in each specific iteration in a set of iterations of the reinforcement learning algorithm, a broadcast of a parameter set ("broadcast parameter set") in such a way that each specific agent in the network updates the specific agent's parameter set with the broadcast parameter set; and
(b) the probability is greater than or equal to 0.5.

6. The method of claim 1, wherein the network is a random Erdos-Renyi graph.

7. The method of claim 1, wherein:
(a) the network is a random Erdos-Renyi graph;
(b) each specific pair of nodes in the graph has a fixed probability of being connected by an edge of the graph, which edge connects a node in the specific pair with another node in the specific pair; and
(c) the probability is less than 0.6.

8. The method of claim 1, wherein the network is not fully connected.

9. The method of claim 1, wherein:
(a) the network comprises a multiple clusters of nodes; and
(b) some but not all nodes in each specific cluster are connected by an edge to a node in another cluster in the set of clusters.

10. The method of claim 1, wherein:
(a) each reinforcement learning agent is a processor or computational core; and
(b) each reinforcement learning agent is housed in a device that is separate from that for any other reinforcement learning agent.

11. The method of claim 1, wherein:
(a) each reinforcement learning agent is a processor or computational core;
(b) each reinforcement learning agent is housed in a device that is separate from that for any other reinforcement learning agent; and
(c) the device is a vehicle or a cellular phone.

* * * * *